United States Patent

[11] 3,632,082

[72] Inventor  Wayne B. Noland
              Avon Lake, Iowa
[21] Appl. No. 808,142
[22] Filed     Mar. 18, 1969
[45] Patented  Jan. 4, 1972
[73] Assignee  Woodford Manufacturing Company
              Des Moines, Iowa
              Original application May 16, 1967, Ser.
              No. 638,891, now Patent No. 3,504,694.
              Divided and this application Mar. 18, 1969,
              Ser. No. 808,142

[54] VALVE ASSEMBLY
     2 Claims, 4 Drawing Figs.
[52] U.S. Cl. .................................................. 251/214,
                                            251/323, 277/108
[51] Int. Cl. ........................................... F16k 41/02
[50] Field of Search ...................................... 251/214,
                              318, 321, 322, 323; 277/102, 108

[56]              References Cited
              UNITED STATES PATENTS
     209,160  10/1878  Deavs et al. ................. 251/214 X

| 1,234,084 | 7/1917 | Pomeroy | 251/214 X |
| 1,558,925 | 10/1925 | Rogers | 251/214 X |
| 2,765,185 | 10/1956 | Mott | 251/214 X |
| 3,103,944 | 9/1963 | Shipper | 251/214 X |

Primary Examiner—William F. O'Dea
Assistant Examiner—David R. Matthews
Attorney—Zarley, McKee & Thomte ABSTRACT: A hydrant having an upstanding pipe with a valve body in its lower end comprising a pair of chambers into which a valve member extends, the inlet water pressure being in communication with the upstanding pipe through one chamber and the upstanding pipe being in communication with a drain port through the second chamber, a handle connected to the upper end of a rod in the pipe and a valve member connected to the lower end of the rod, a valve member being movable to either drain water from the upstanding pipe or retain water in the upstanding pipe, and packing material compressed into a chamber around the valve member actuating rod and engaging a washer on the rod which forms the bottom of the packing chamber.

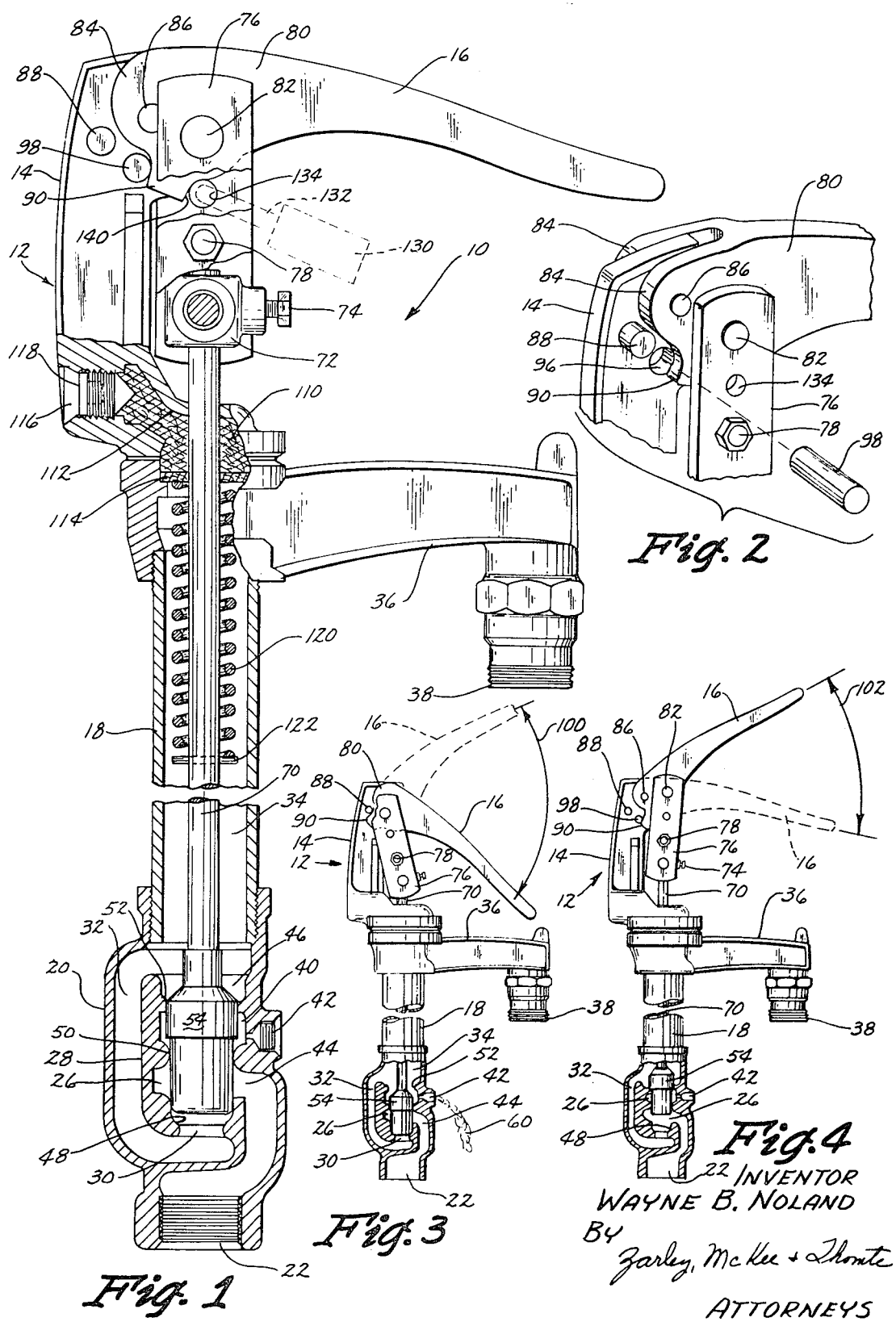

VALVE ASSEMBLY

This is a divisional application of application Ser. No. 638,891 filed May 16, 1967 now U.S. Pat. No. 3,504,694

The hydrant of this invention was previously designed to always operate such that it would not freeze. This meant that the water in the upstanding pipe would drain from the pipe out through the upper chamber in the valve body member to a drain port in communication therewith. In the summertime this was a completely unnecessary waste of water since water could remain in the upstanding pipe without causing any harm since it would not freeze. Additionally, the packing nut around the valve member actuating shaft had to be periodically replaced and this involved complete disassembly of the hydrant.

This invention involves a stop means for limiting the downward movement of the valve member in the valve body to a position wherein both valve chambers in the valve body are closed such that in the summertime the water will not drain from the upstanding pipe. In the winter the stop pin may be removed and thus when the actuating handle is completely lowered the valve member will be completely seated in the lower chamber thus opening the top chamber to communication with the upstanding pipe and accordingly drain the water therefrom through the drain port in the upper chamber. Additionally, the sealing of the actuating rod is accomplished by a pellet of packing which is inserted through a small opening in the side of the hydrant housing into a chamber surrounding the actuating rod. After the chamber is completely filled a set screw is inserted in the opening to close it. A washer is placed on the actuating rod and a spring bears against it to cause it to compress the packing material around the actuating rod and thereby provide the seal. The spring also tends to maintain the valve member in its lowered closed position.

These and other features and advantages of this invention will become readily apparent to those skilled in the art upon reference to the following description when taken into consideration with the accompanying drawings, wherein:

FIG. 1 is a fragmentary side elevation view of the hydrant of this invention;

FIG. 2 is a fragmentary perspective view of the handle and linkage as they cooperate with the stop pin used in warm weather conditions;

FIG. 3 is a fragmentary side elevation view in reduced scale illustrating the hydrant when the handle and valve member are completely lowered thereby opening the drain port to communication with the upstanding pipe and thereby making the hydrant nonfreezable and usable during cold weather conditions; and FIG. 4 is a view similar to FIG. 3 showing the handle and valve member completely raised for water to flow from the hydrant spigot.

The hydrant of this invention is generally referred to by the reference numeral 10 as seen in FIG. 1 and includes a housing 12 having a frame portion 14 to which a handle 16 is pivotally connected. An upstanding pipe 18 extends downwardly from the frame portion 14 and is connected to a valve assembly 20.

An inlet passageway 22 on the bottom of the valve assembly 20 communicates with an inlet opening 24 in a lower chamber 26 in an internal valve body 28. An outlet opening 30 is formed in the bottom end of the chamber 26 for communication with a passageway 32 which is in turn in communication with the passageway 34 extending through the upstanding pipe 18. A spigot 36 is connected to the upper end of the upstanding pipe 18 and has an outlet threaded member 38.

An upper chamber 40 is formed in the valve body 28 and is coaxially disposed relative to the lower chamber 26. A drain port 42 is in communication with the lower end of the upper chamber 40 and thus is in commmunication with an inlet upper opening 46. A relatively deep seat 48 is provided in the bottom of the lower chamber 26 which forms the outlet opening 30. An annular convex shoulder 50 is formed on the inner side of the valve body 28 and forms the upper and lower chambers 26 and 40 respectively. An upper annular shoulder 52 is provided and serves as a seat for closing the upper chamber to flow through the inlet opening 46.

A valve member 54 is movable within the valve body 28 and when in the position of FIG. 1 is in seating engagement with the seat 48 in the lower chamber 26 thereby closing its outlet opening 30 and also the annular shoulder 52 forming the seat in the upper chamber inlet opening 46 and accordingly closing the outlet drain port 42. In FIG. 3 the valve member 54 has been completely lowered into the seat 48 and thus moves out of engagement with the upper seating shoulder 52 whereby the upstanding pipe 18 is in communication with the drain port 42 to drain water 60 from the passageway 34 in the upstanding pipe 18.

In FIG. 4 the valve member 54 is completely raised and thus is in sealing engagement with the seating shoulder 52 in the upper chamber 40 while being spaced above the seat 48 in the lower chamber 26 thereby opening the inlet opening 22 in the main line to the passageway 32 in the valve assembly 20.

The valve member 54 is connected to an elongated actuating rod 70 extending upwardly through the upstanding pipe 18 where it is connected at its outer end to a trunnion 72 adjustably held thereon by a set screw 74. The outer ends of the trunnion 72 are pivotally received in openings formed in the lower end of linkage plate 76. A bolt 78 interconnects the linkage plate 78 and is positioned above the trunnion 72. At the upper end of the linkage plates the head 80 of the handle 16 is pivotally connected by stub pins 82.

The head 80 has a pair of clevis portions 84 in which the upper end of the housing portion 14 is received and pivotally connected thereto by a pin 86. A stop pin 88 is provided on the housing frame portion 14 for engagement with a nose portion 90 on the head 80 when the valve member 54 has been completely moved to its lowermost closed position as seen in FIG. 3.

A pin hole 96 is formed in the housing frame portion 14 adjacent the pin 88 to detachably receive a second stop pin 98 which also engages to nose 90 on the head 80 as the handle 16 is being lowered as seen in FIG. 1 whereby the valve member 54 is moved downwardly only to a position where it is in sealing engagement with the seating shoulder 52 in the upper chamber 40 of the valve body 28 and also the lower seat 48 of the chamber 26.

The relatively longer arc 100 in FIG. 3 through which the handle 16 may move indicates the operational condition of the hydrant during winter usage while the arc 102 in FIG. 4 indicates the shorter stroke through which the handle 16 may move during the summer usage since it is limited by the stop pin 98.

The actuating rod 70 is sealed at its upper end by a plug of packing material 110 compressed into a chamber 112 through which the rod 70 extends and in which there is a sealing washer 114 as the bottom wall of the chamber 112. An inlet opening 116 is provided in the housing 12 for communication with the chamber 112 and thus the packing plug is inserted through this opening and then is closed by a set screw 118. A compression spring 120 is concentrically mounted on the actuating rod 70 and bears against the stop pin 122 at its lower end and against the sealing washer 114 at its upper end. It is thus seen that the spring 120 tends to move the actuating rod 70 downwardly thereby normally tending to close the valve member or move it downwardly to its lowermost position. Additionally the spring 120 applies pressure to the bottom side of the sealing washer 114 which thereby tends to compress the packing material 110 in the packing chamber 112 and accordingly maintain a self-adjusting continuous seal around the actuating rod 70. Should new packing material ever be needed it is only necessary to remove the set screw 118 and insert an additional plug of conventional packing material. Screw 118 can also be utilized to adjust the pressure on packing material 110.

Thus in use it is seen that during the summer the pin 98 is frictionally placed in the opening 96 and thereby limits the downward movement of the handle 16 thus preventing the drain of the upstanding pipe 18 and the incidental waste of water in the passageway 34. However, in the winter, the pin 98 is removed from the opening 96 thereby permitting the handle to be moved to its position in FIG. 3 placing the passageway 34 in the upstanding pipe 18 in communication with the drain port 42 thereby protecting the hydrant against freezing.

Should it be desired to lock the hydrant in a closed position a lock 130 having a pin 132 may be inserted through aligned openings 134 in the linkage plate 76 and thereby engage the inner surface 140 of the nose portion 90 on the head 80 of the handle 16 and thereby prevent it from being moved upwardly to its open position of FIG. 4.

I claim:

1. A valve assembly, comprising,
a housing,
an actuating member in said housing,
a valve body, and
a valve member in said body connected to said actuating member; an elongated pipe in said housing, said actuating member movably positioned within said elongated pipe, said actuating member having one end portion extending outwardly of said pipe from said housing,
a passageway connected said valve body to said pipe and said pipe having an outlet remotely located from said valve body, and
a seal means positioned in said pipe around said actuating member between said valve body and said outlet,
said seal means including a chamber around said actuating member and a port extending to the exterior of said pipe from said chamber,
packing material tightly fitting said chamber to form a seal around said actuating member,
a removable plug disposed in said passageway,
a washer element positioned on said actuating member and in the bottom of said chamber,
a spring positioned on said actuating member in said pipe opposite said packing material and bearing against said washer,
a stop element carried on said actuating member for engagement with said spring remotely of said washer whereby said packing material is maintained in a compressed condition around said actuating member to provide a seal therearound and whereby actuating movement of said actuating member in one direction with respect to said pipe during the normal operation of said valve assembly further compresses said spring to further compress said packing material around said actuating member.

2. A valve assembly comprising:
a housing;
an actuating member in said housing;
a valve body;
a valve member in said body connected to said actuating member;
said valve body including a pair of chambers, one of said chambers having an inlet and an outlet opening, and said other chamber having an inlet opening and an outlet opening, a passageway extending between the outlets of said first and second chambers through said second chamber and inlet thereof, said passageway communicating with said housing;
said valve member being movable from an open position providing fluid communication between said first chamber and passageway to a first position closing said outlet of said first chamber to communication with said outlet of said second chamber and closing said outlet of said second chamber to communication with said passageway and to a second position closing said outlet in said first chamber and opening said outlet in said second chamber to communication with said passageway;
stop means selectively limiting the movement of said valve member from said first position to said second position;
said actuating member including a link member pivoted thereto;
a handle member pivotally connected to a portion of said housing and to the opposite end of said link member outwardly of said connection to said actuating member;
a stop element on said handle member adapted to move adjacent said link member when said valve member is moved to said second position;
said stop means being selectively secured to said portion of said housing in the path of said stop element for limiting movement of said valve member from said first position to said second position;
said housing having an elongated pipe in which said actuating member is movably positioned;
sealing means positioned in said pipe around said actuating member, said sealing means including a chamber around said actuating member, said chamber having a threaded port extending to the exterior of said pipe from said chamber; packing material being fitted in said chamber; and a plug threadably inserted in said threaded port for providing adjustment of the tightness of said packing material.

* * * * *